WITNESSES
John E. Healy Jr.
James F. Young

INVENTOR
Francis T. Thompson
BY
Benjamin DeWitt
ATTORNEY

United States Patent Office 3,048,824
Patented Aug. 7, 1962

3,048,824

SIGNAL DISTRIBUTION SYSTEM FOR DISTRIBUTING INTELLIGENCE SIGNALS FROM A SINGLE SOURCE TO A PLURALITY OF UTILIZATION CHANNELS

Francis T. Thompson, Penn Township, Allegheny County, Pa., assignor to Westinghouse Electric Corporation, East Pittsburgh, Pa., a corporation of Pennsylvania Filed July 10, 1958, Ser. No. 747,799
8 Claims. (Cl. 340—173)

This invention relates to signal distribution systems and more particularly to apparatus for distributing intelligence or information bearing signals from a single source to a plurality of utilization channels.

While the present invention may find application in various systems for utilizing information bearing signals to perform control functions, it has particular utility in connection with space distributed display of visual indicia such as in the display of television, radar, facsimile and the like images. For convenience the invention is hereafter described in the particular embodiment which has been found most suitable for display of video signals in television-type apparatus. It is, of course, to be expressly understood that the invention may have broad application in various control systems other than television.

In copending application Serial No. 727,916, now Patent No. 2,875,380, issued February 24, 1959 to Pierre M.G. Toulon and assigned to the same assignee as the present application, there is disclosed an image display apparatus or screen which may comprise thousands of separate, spatially distributed electroluminescent light-producing elements each having associated therewith at least one intensity control element. The intensity control elements set forth in that application take the form of non-linear dielectric capacitors including a dielectric material such as barium titanate. Such capacitive members are responsive to a control signal or control potential to govern the light power potential applied to, and the light emitted from each electroluminescent element.

In the use of such display screens for television radar and the like systems, it is necessary to provide high-speed switching means for distributing the information-bearing signal from a single source or input channel to a large plurality of individual channels extending to the separate intensity control elements. In conventional television systems, the discrete video signals for controlling separate picture elements of the display are received as time sequential elementary components of the video wave. At the display screen it is desirable to have light emitted continuously from each picture element during the whole frame time in proportion to the instantaneous value of the video wave corresponding to the desired brightness of a particular element. By arranging for storage of a signal corresponding to the instantaneous value of the video wave, it is possible to substantially increase the average brightness of the display and completely eliminate flicker of the type which is inherent in cathode ray type television displays.

In order to accomplish the foregoing, a potential corresponding to the discrete video information for a particular picture element may be created instantaneously and retained during the frame time and then erased or dissipated so as to provide for storage of a second potential corresponding to the desired brightness of that same picture element during the next subsequent frame time. One method of obtaining continuous light output from a particular picture element is to store a potential corresponding to an instantaneous video signal input and utilizing the stored potential to bias a non-linear dielectric capacitor. The controlled reactance of the non-linear capacitor is utilized to control the alternating current light power applied to an elementary portion of the electroluminescent screen by way of the elementary capacitor. That method necessitates extremely high-speed distribution of instantaneous video signal from the common video signal input channel to the spatially distributed capacitive elements associated with the elementary electroluminescent cells of the display screen.

In the prior art some attention has been given to the problem of high-speed distribution of signals from a single channel to a plurality of separate output channels. In one prior art arrangement, inverse biased rectifier devices have been used as pulse actuated switches for periodically connecting different output channels to a common input signal source. Simultaneous application of switching pulses and information-bearing signal to a rectifier device has been accomplished by means of pulse transformers connected serially with the input signal to each and every rectifier device. Such an arrangement necessitates the use of a separate pulse transformer for each rectifier device or at least one pulse transformer corresponding to each output channel. In apparatus such as television or radar, utilizing solid state display screens comprised of many thousands of signal responsive elements, the provision of the necessary number of pulse transformers would be at least extremely expensive if not completely impractical.

Accordingly, it is a primary object of this invention to provide an improved signal distribution system for sequentially applying signals from a common source to a plurality of independent output channels.

It is a further object to provide a signal distribution system of the type described which requires a minimum number of circuit components and a minimum of complexity.

It is an additional object of the invention to provide for periodically establishing and maintaining on a potential storage element, a potential corresponding to a predetermined instantaneous amplitude of an information-bearing signal.

It is another object of the invention to provide for sequentially distributing an information-bearing or intelligence signal to establish and maintain different potentials corresponding respectively to different instantaneous values of the information-bearing signals and for employing said different potentials to respectively control a plurality of separate functions.

It is a different object of the invention to provide a switching circuit in which a diode for periodically passing the input video signal has two potentials applied to the electrodes thereof, one of the potentials being variable in correspondence with the instantaneous value of the control signal to be passed and the other potential comprising a periodically recurrent pulse of predetermined amplitude.

The novel features which are believed to be characteristic of the invention both as to its organization and method of operation, together with further objects and advantages thereof, will be better understood from the following description considered in connection with the accompanying drawings. It is to be expressly understood that the drawings are for the purpose of illustration and description only and are not intended as a definition of the limits of the invention.

Figure 1:
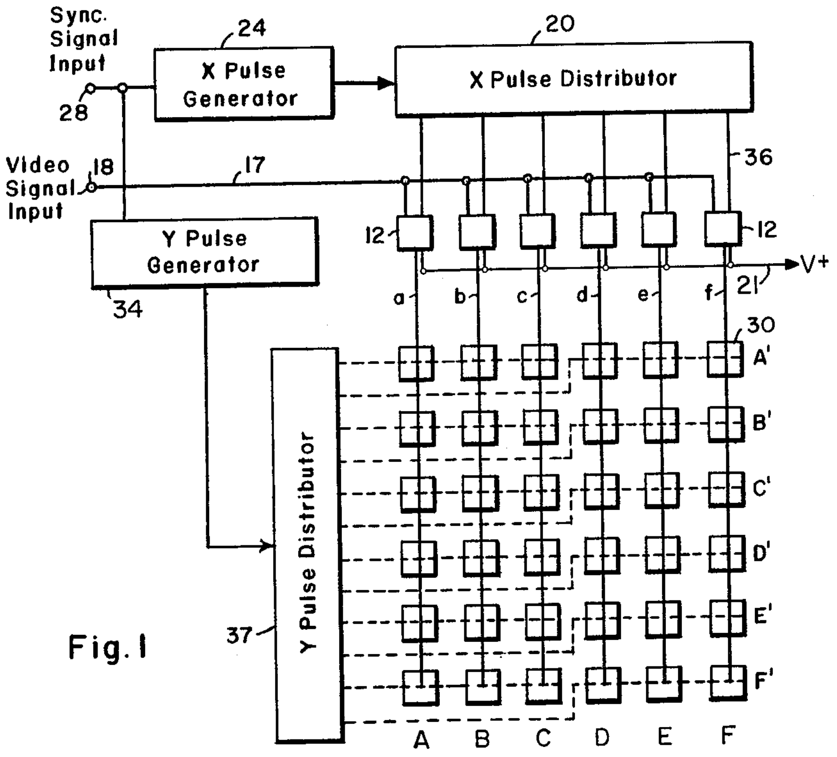
FIGURE 1 is a schematic representation of an image display apparatus embodying the invention.

Referring now to the drawing and to FIG. 1 in particular, there is shown a quasi-electronic signal distribution system for supplying separate control potentials to the elementary light-generating cells of an electroluminescent display screen. The display screen is shown as comprising 36 display elements 30 arranged spatially in six columns A, B, C, etc., and in six rows A′, B′, C′, etc. It is to be understood that the display screen would normally include many thousands of the elements 30 arranged in rows and columns in a similar manner. In the embodiment as shown, the number of rows and columns are limited for convenience of explanation, and it is to be understood that the number of elements as shown represents only a small fractional part of an actual display in accordance with the invention.

A control signal which, by way of example, may be a video information-bearing signal from the video amplifier of a conventional television receiver circuit is applied to the control signal input terminal 18 and is applied therefrom to a plurality of intermediate switching and storage devices 12 with the control signal being continuously applied to the input of each. Simultaneously, a synchronizing signal is applied to input terminal 28 and thence to an X-pulse generator 24 and also to a Y-pulse generator 34. The signal applied to terminal 28 may, for convenience, be considered as being of the type derivable from the synchronizing signal separation circuit of a conventional television receiver, and is modified in a manner to be described hereinafter by the pulse generators 24 and 34. Signals from the X-pulse generator are applied to an X-pulse distributor 20 which has a plurality of output circuits 36 for sequential application of switching pulses to the switching devices 12. As shown in FIG. 1, the heavy lines indicate schematically the paths of the video signal and the resultant video control potentials from the input terminal 18 through the switching and storage devices 12 to the elementary display devices 30. The lighter lines in FIG. 1, indicate the paths of switching signals or pulses from the synchronizing signal input terminal 28 to the X-pulse generator 24 and from the X-pulse generator 24 through the X-pulse distributor 20 and by way of its plural output circuits 36 to the intermediate pulse actuated switching devices 12. The lighter lines also indicate the paths of the analogous switching signals to the Y-pulse distributing means 37 and from its plural output circuits to the individual image display devices 30. The X-pulse distributor 20 and the Y-pulse distributor 37 may comprise pulse delay lines constructed in accordance with practices well known in the art and may be either distributed or lumped-parameter L-C delay lines. In further embodiments, the pulse distributing means 20 and 37 may, if so desired, comprise ultrasonic delay lines, certain types of magnetron beam switching tubes, or a number of amplitude sensitive pulse generators sequentially activated by a sawtooth or similar voltage waveform applied simultaneously to these pulse generators.

Each of the elementary light-producing devices 30 as shown in FIG. 1, represents the combination of at least one ferroelectric or non-linear dielectric capacitor and an electroluminescent transducer as described in the aforementioned Toulon application together with a switching and storage device 13 similar to the intermediate switching and storage devices 12.

The operation of the system of FIG. 1 may be assumed to begin at the upper left element A′A and to proceed from left to right and from top to bottom. The video signal for the first three elements A′A, A′B and A′C is sequentially commutated by the first three switching devices 12 and charges corresponding to sequential instantaneous values of the video signal are stored in the devices 12 and continuously applied to the elements A′A, A′B and A′C by means of conductors *a*, *b* and *c*. After commutation to the first three switching and storage devices 12 is completed, a pulse from the first output circuit of the Y-pulse distributor 37 actuates the first three element switching devices 30 to transfer the stored video control potentials to the respectively associated light-producing devices. Simultaneously, with the "en masse" transfer of the first three control potentials to the light-producing devices, video signal is commutated sequentially by the second group of three switching devices 12 and potentials are stored on the storage components included therein. After such commutation is completed, a pulse from the second output circuit of the Y-pulse distributor 37 is applied to the second group of three element switching and storage devices in row A′ and potentials from the storage devices 12 are transferred and applied to the light-producing devices A′D, A′E and A′F, thereby controlling those devices to produce light outputs proportional to the different potentials applied thereto, which potentials correspond to the different instantaneous values of the video signal for those elemental portions of the picture. Simultaneously, with the en masse transfer of potentials to the picture-producing elements A′D, A′E and A′F, additional video signal is commutated by the first group of three switching and storage devices 12 and potentials corresponding to instantaneous values are stored therein and thereafter transferred to the charge storage elements included within the element switching and storage devices B′A, B′B and B′C.

The distribution of potentials corresponding to instantaneous values of the video signal proceeds in the same manner until individual potentials are stored in the element charge storage devices of each of the light-producing elements 30. Immediately upon completion of charge storage in the display element F′F, the next frame is started and the whole process is repeated beginning with the element A′A. It is to be understood that at the beginning of the second frame the previously stored charge at element A′A is erased or dissipated immediately before the application of a new charge thereto. Thus, it is seen that high-speed distribution of potentials differentially corresponding to the desired brightness of separate picture elements is accomplished with the video control potentials being stored during a complete frame time to enable continuous light output for the period of one frame with that light output from each element corresponding to a different instantaneous value of the input control signal.

Figure 2:
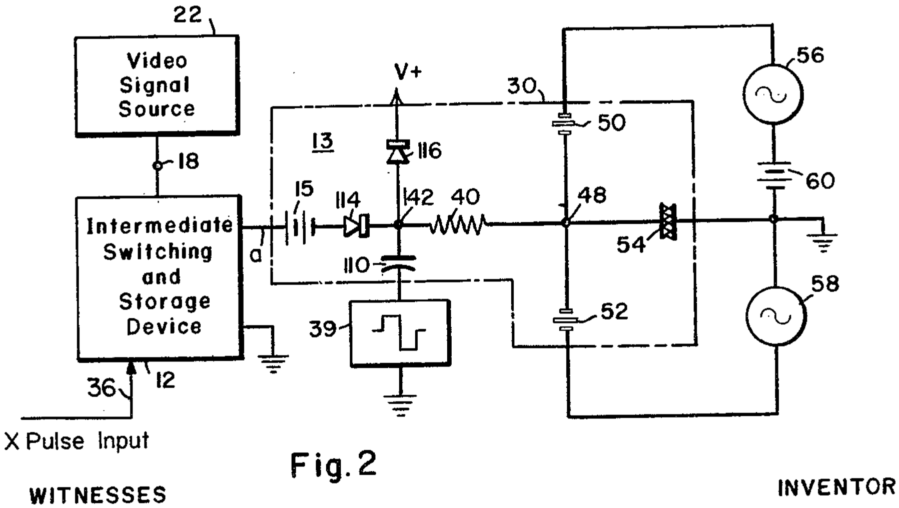
FIG. 2 is a schematic diagram of one form of constituent or elementary switching circuit in accordance with the invention.

FIG. 2 shows in detail the components of a basic element switching and storage device 13 and a light-producing element 30 associated therewith. As shown in FIG. 2, the video signal is derived from a signal source 22 and is applied by way of an input terminal 18 to an intermediate switching and storage device 12 corresponding to one of the switching and storage circuits 12 shown in FIG. 1. From the intermediate switching and storage device 12 a stored video control potential, which has a time duration substantially equivalent to the time necessary to commutate signal to all of the elements in one row, is applied to an element switching and storage device 13 electrically associated with one of the light-producing devices 30 such as A′A. The element switching and storage device 13 includes a potential storage component 110 which may take the form of a capacitor and first and second unilaterally conductive devices 114 and 116. The first unilaterally conductive device or rectifier 114 is connected serially with a source of biasing potential 15 in the signal path between the intermediate storage device 12 and the element storage component 110. It is to be understood that the biasing potential source 15 may take other forms known to those skilled in the art, may be connected serially at any desired point in the circuit of capacitor 110, rectifier 114, storage device 12, and pulse source 39. Alternatively the bias source may be entirely eliminated by providing a control signal of polarity such that the output of storage device 12 is always negative with respect to ground. The rectifier 114 is operative when pulse actuated to pass or transfer a video control potential from the intermediate storage device 12 to the element storage capacitor 110. Thus, the rectifier 114 may be designated as a charging rectifier.

Common terminal 142 which is connected to the cathode of the charging rectifier 114 and the upper electrode of the capacitor 110 is further connected by way of an erasing rectifier 116 to a source of positive potential or erasing bias V+. The erasing rectifier 116 is operative in response to an appropriate pulse actuation to dissipate or erase the video control potential theretofore stored in the capacitor 110. The lower electrode of the capacitor 110 is connected to a switching pulse source 39 with the second terminal of the pulse source 39 being connected to a point of reference potential or ground. The pulse source 39 has an output signal corresponding to the signal derived from the first output circuit of the Y-pulse distributor 37 as shown in FIG. 1. The character of the pulse derived from pulse source 39 is shown at 44 and 46 in FIG. 4. The first portion of the actuating pulse is a positively going erasing pulse 44 of short duration which is immediately followed by a charging pulse 46 of a predetermined amplitude. When the positive erasing pulse 44 is applied to the lower electrode of capacitor 110, it is transferred therethrough to common terminal 142 and thence to the anode of the erasing rectifier 116, driving the anode more positive than the positively biased cathode so that the erasing diode 116 becomes highly conductive and substantially dissipates or erases the previously stored charge from capacitor 116. Immediately thereafter the charging pulse 46 is applied to the lower electrode of capacitor 110 and is transferred therethrough to common terminal 142 and thence to the cathode of charging rectifier 114, driving the cathode thereof more negative than the negatively biased anode so htat rectifier 114 becomes highly conductive and permits a video control potential to pass from the intermediate storage device 12 to the element storage capacitor 110. Thus, charging rectifier 114 will conduct to impose a stored potential on capacitor 110 only when common terminal 142 is driven negative with respect to the anode of rectifier 114 by means of a negative pulse from pulse source 39.

Common terminal 142 is connected through a decoupling resistor 40 to a common terminal 48 of elementary light-producing cell 30 which cell may be of the type described in the aforementioned Toulon application Serial No. 727,916, now Patent 2,875,380, and which includes a pair of non-linear dielectric capacitors 50 and 52 each having one electrode connected to the common terminal 48. An electroluminescent cell 54 is also comprised within the light-producing element 30 and is connected between the common terminal 48 and a point of reference potential or ground. A first source of light power potential 56 is connected in series with a source of biasing potential 60 to the upper electrode of the non-linear dielectric capacitor 50. A second source of light power potential 58 is connected between the point of reference potential and the independent electrode of the second non-linear dielectric capacitor 52. The second light power potential source 58 applies an alternating current potential across the electroluminescent cell 54 and the non-linear dielectric capacitor 52 in series. The first light power potential source 56 applies an alternating current potential across the non-linear dielectric capacitor 50 and the electroluminescent element 54 in series.

By variation of the video control potential applied to common terminal 48 from charge storage element 110, the respective capacitances of the non-linear dielectric capacitors 50 and 52 can be varied. The parameters of the light-producing device 30 preferably are so arranged that with zero control potential applied to the common terminal 48, substantially no alternating current potential is applied to the electroluminescent element 54 because the reactances of capacitive elements 50 and 52 are balanced so that substantially the entire voltage from light power source 56 appears across the capacitor 50 and substantially the entire voltage from light power source 58 appears across the capacitor 52. Upon application of a video control potential from charge storage capacitor 110 to terminal 48, the reactance of capacitor 50 will be substantially increased while the reactance of capacitor 52 is substantially decreased, thus upsetting the balance of the alternating current light power potentials from sources 56 and 58 so that electroluminescent element 54 is energized in proportion to the degree of such unbalance. Accordingly, element 54 generates light of an intensity corresponding to the magnitude of the video control potential contemporarily applied to terminal 48 from capacitor 110.

Figure 3:
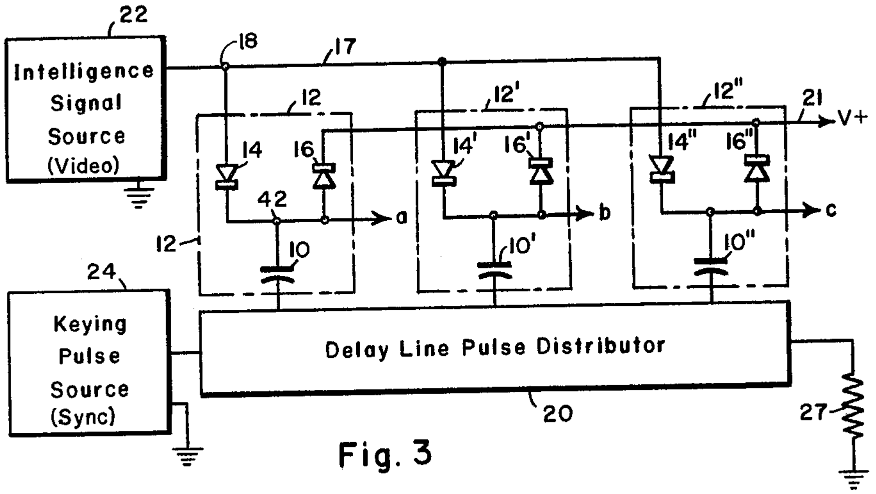
FIG. 3 is a schematic diagram showing an interconnected plurality of the switching devices of FIG. 2 together with means for sequentially actuating the switching devices.

In FIG. 3 there is shown three intermediate switching and charge storage devices 12, 12' and 12'', corresponding to the first three intermediate charge storage devices 12 as shown in FIG. 1. Their respective output circuits are designated as *a*, *b* and *c* corresponding to the channels *a*, *b* and *c* of FIG. 1. An intelligence signal source 22 having its output terminals connected between a point of reference potential and a video signal distribution bus 17 is provided for supplying information-bearing signal continuously to each and every one of the intermediate switching and storage devices 12. The intelligence signal source 22 may comprise the video signal circuitry of a conventional television receiver as stated heretofore or alternatively, it may be the information-bearing signal circuits of a radar apparatus or the control signal supplying circuitry of other systems which provide an information-bearing signal for the variable control of predetermined functions. The video distribution bus is directly connected to the anodes of the charging diodes 14, 14' and 14''. The cathode of the charging diode 14 is connected to a common terminal 42 with the common terminal 42 being also connected to the upper electrode of intermediate control potential storage capacitor 10, to the anode of the erasing diode 16 and to an individual output channel *a*. The lower electrode of each potential storing capacitor 10 is connected to a separate output terminal of the pulse distributing delay line 20. The pulse distributing means 20 may be any one of various types as stated heretofore in connected with FIG. 1.

A source of keying pulses 24 is connected between the input terminal of the pulse distributing delay line 20 and a point of reference potential or ground. The output end of the pulse distributing delay line 20 may be terminated by means of a resistance 27 connected from the output end to ground. The resistance 27 preferably has a value approximately equal to the characteristic impedance of the delay line 20 so as to prevent standing waves or reflected spurious signals in the delay line 20. The cathodes of the erasing diodes 16 are connected to a common erasing bias bus 21 which is supplied with an erasing bias of predetermined magnitude from a source of positive biasing potential V+.

Figure 4:
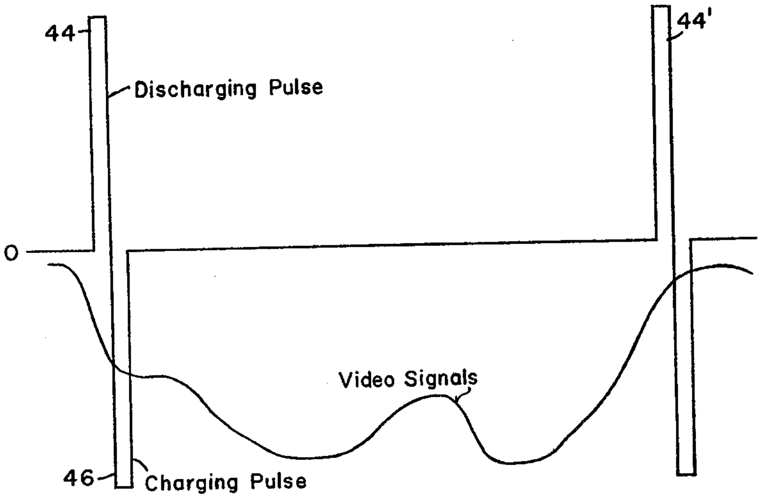
FIG. 4 is a voltage waveform diagram illustrating the mode of operation of the circuit disclosed in FIG. 3.

In the operation of the system of FIG. 3, an information-bearing control signal such as that indicated by the numeral 45 in FIG. 4 is applied to the video distribution bus 17 from the signal source 22 and is effective to maintain the anodes of all the charging diodes 14 at least slightly negative relative to the point of reference potential. It is to be understood that the negative blocking bias for the diodes 14 may in this embodiment be provided by the unidirectional component of the video signal representing the average brightness of a television scene, or if desired, a conventional source of biasing potential may be connected serially with the signal source 22. When the apparatus of FIG. 3 is utilized in connection with a source of information-bearing signal which does not include a unidirectional component, but which supplies an information-bearing signal varying both positively and negatively with respect to ground, a source of negative biasing potential may be connected serially with the signal source 22 between the point of reference potential and the video distribution bus 17. The present invention encompasses such an arrangement as well as the arrangement in which the bias for charging diode 14 is provided by the unidirectional component of the video signal.

With the negatively biased video signal being applied to the anodes of the charging diodes 14, each and every one of the charging diodes is inversely biased so as to be nonconductive. Upon application of a keying pulse, such as that indicated at 44 and 46 in FIG. 4, to delay line 20, the lower electrode of the first charge storage capacitor 10 will be driven positive by the positive erasing pulse 44. The positive pulse is transferred through the capacitor 10 to the common terminal 42 and thence to the anode of the erasing diode 16 so that it is driven more positive than the erasing bias supplied by bus 21. The diode 16 becomes highly conductive for a period corresponding to the time duration of the positive pulse 44 and any charge which may have been present on the first capacitor 10 is erased or dissipated by current flow through the diode 16 to the bus 21. Upon termination of the erasing pulse 44, a negative storing pulse 46 is applied to the lower electrode of the charge storage capacitor 10 and is applied therethrough to the common terminal 42 and the cathode of the charging diode 14. The negative pulse 46 drives the cathode of the diode 14 more negative than the negatively biased anode thereof and the charging diode 14 becomes highly conductive for a period of time corresponding to the duration of the negative charging pulse 46. Current flows from the signal source 22 to the capacitor 10 whereby the capacitor 10 assumes a charge corresponding to the instantaneous value of the video control signal 45 at the time of occurrence of the charging pulse 46. The potential on capacitor 10 thus is representative of the desired brightness of an individual picture element, and may be utilized to control an individual light producing member. The video control potential on capacitor 10 is continuously applied to utilization channel "*a*" which may extend to a plurality of the potential storing and light-producing devices 30 as shown in column A of FIG. 1. Each of the blocks 30 in column A of FIG. 1 comprises an element storage and switching circuit as shown within the dot-dash box 30 of FIG. 2.

After completion of the storing of a video control potential on the first capacitor 10, the keying pulse from source 24 travels along the delay line 20 to the next output circuit or tap thereof, thus leaving the lower end of the first capacitor 10 at a predetermined reference potential or ground. Thus, the video control potential at common terminal 42 and applied to channel "*a*" is the same voltage with respect to ground as the voltage appearing across the electrodes of the first capacitor 10. Both the charging diode 14 and the erasing diode 16 remain biased to the nonconductive or blocking condition until the application of a subsequent pulse to the lower electrode of the capacitor 10. Accordingly, the charge stored on capacitor 10 may not leak off through either of the diodes and is available for a predetermined period of time at the output channel "*a*." Upon arrival of the keying pulses 44 and 46 at the lower electrode of the second charge storing capacitor 10', an erasing and charge storing process is accomplished in the switching and charge storing device 12' in the same manner as just described with reference to the switching and charge storing device 12. The process continues in a similar manner until different video control potentials are sequentially stored in each of the capacitors 10, 10', 10'', etc. It is to be understood that the different charge storing capacitors and their associated switches are actuated time sequentially so that the video control potentials stored on the different capacitors are representative respectively of different sequential instantaneous values of the input video control signal 45.

In the particular embodiment of FIG. 3, the means for providing sequential keying pulses has been shown as a delay line 20. It is to be understood that means other than a delay line may be utilized for sequentially applying keying pulses to the capacitors 10, 10', etc., from the keying pulse source 24. In the system of FIG. 3, the diodes 14 and 16 are shown as being connected in a particular polarity. It is to be understood that the diodes 14 and 16 may be connected in the reverse orientation, in which case the polarity of the pulses 44 and 46 must be reversed, the erasing bias potential applied to bus 21 must be negative rather than positive, and the average unidirectional value of the control signal as applied to the video bus 17 must be positive rather than negative.

The respective amplitudes of the pulses 44 and 46 should be predetermined to have values slightly exceeding the greatest peak-to-peak excursion of the video control signal. Such amplitude of the erasing pulse is necessary to insure that previously existing charges on the storing capacitors will be entirely eliminated before the application of a new instantaneous signal to the particular capacitor. Such storing pulse amplitude is essential to place a sufficient charge on capacitor 10 so that the cathode of diode 14 will be positive relative to the anode during the interval between storing pulses. This characteristic is shown at 44' in FIG. 4 where the video signal wave 45 has a maximum negative excursion representative of maximum brightness of the corresponding elemental picture area. The erasing pulse at 44' is shown as having a predetermined amplitude slightly exceeding the maximum excursion of the video wave. The respective amplitudes of the erasing and storing pulses 44 and 46 may, if so desired, be equal predetermined amplitudes, but such is not essential. In order that the net unidirectional pulse potential shall correspond to the potential between pulses, the area of the erasing pulse may be made equal to the area of the charging pulse 46.

The arrangement of the present invention is particularly advantageous in that a single source of keying pulses at 24 may be utilized, video signals may be supplied to all of the switching and charge storing devices 12 from a common bus 17, and erasing bias may be applied to all of the erasing diodes 16 from a common source of biasing potential V+. In a display system utilizing hundreds or thousands of separate light-producing elements, the present invention enables distribution of control potentials to such elements without the use of a large plurality of pulse transformers or other extensively duplicated pulse supplying components. In the system of the present invention, the only elements which must be provided in large numbers are the intermediate diodes 14 and 16, the intermediate charge storing capacitors 10, the element diodes 114 and 116, and the element charge storing capacitors 110. The switching diodes 14 and 16 may comprise solid state devices such as the silicon diode type 1N54. Such diodes are physically small, consume very little energy and produce negligible heat. Accordingly, a system in accordance with the present invention may be constructed to occupy a minimum space and to have an appreciably smaller weight than prior art arrangements for performing the same functions.

In summary, the present invention provides a signal distribution system which may be advantageously utilized in television, radar or the like apparatus for distributing a control signal sequentially representative of successive information to a plurality of separate and distinct channels. The signal distribution system includes a plurality of control potential storage elements or capacitors which are individually connected to apply signals representative of different sequential portions of information to different ones of the output channels. A plurality of separate pulse-actuated switching devices are provided with each being independently connected and actuated to periodically transmit signal from the common source of information-bearing signal to an individual one of the signal storage elements. In order to sequentially actuate the separate switching devices, there is provided a source of keying pulses for generating a series of time spaced voltage pulses and the source of keying pulses is interconnected to all of the different pulse-actuated switching devices so as to sequentially apply pulses to successive ones of the switching devices.

While the present invention has been shown in certain embodiments only, it will be obvious to those skilled in the art that it is not so limited but is susceptible of various changes and modifications without departing from the spirit and scope thereof.

I claim as my invention:

1. In a signal distribution system, a source of time sequential information-bearing signals, means for providing a series of time spaced switching pulses, a unilaterally conductive device having a pair of terminals and responsive to switching pulses of a predetermined magnitude, circuit means for applying said time sequential signals to one terminal of said unilaterally conductive device, a signal storage element having a low impedance to said switching pulses coupled at one end to said means for providing switching pulses and at the other end to the other terminal of said unilaterally conductive device so that said switching pulses are applied through said storage element to unbias said unilaterally conductive device, and means connected to said other end of the storage element for continuously utilizing the signal stored thereby during the time intervals between said pulses.

2. In a signal distribution system, a source of time sequential information-bearing signals, means for generating a series of time spaced switching pulses, a unilaterally conductive device having a pair of terminals and responsive to said switching pulses, circuit means for applying said time sequential signals to one terminal of said unilaterally conductive device, a signal storage element connected between said switching pulse generating means and the other terminal of said unilaterally conductive device and means connected across the series combination of said storage element and said pulse generating means for continuously utilizing the signal stored by said element during the time intervals between said time spaced pulses.

3. In a system for time sequentially distributing an information-bearing signal to a plurality of channels, a plurality of signal storage elements, each having first and second terminals, with the first terminal of each storage element being connected to a separate one of said channels, pulse means for applying time spaced switching pulses successively to the second terminals of said storage elements, means for supplying information-bearing signals, a plurality of unilaterally conductive devices, each of said devices being connected between said means for supplying signals and the first terminal of a different one of said signal storage elements, bias means for applying a bias potential to each of said devices to normally maintain said devices nonconductive, said storage elements being arranged to present a relatively low impedance to said switching pulses so that said pulses are applied therethrough to said unilaterally conductive devices for unblocking said devices to pass information representative charge to said storage elements, each of said channels comprising signal utilization means for continuously producing an output effect indicative of the charge stored by the corresponding storage element without dissipating said charge.

4. In a system for time sequentially distributing an information-bearing signal to a plurality of channels, a plurality of charge storage elements, each having first and second terminals, with the first terminal of each charge storage element being connected to a separate one of said channels, pulse means for applying time spaced switching pulses successively to the second terminals of said charge storage elements, means for supplying a time sequential series of information-bearing signals, a plurality of unilaterally conductive devices, each of said devices being connected between said signal supplying means and the first terminal of a different one of said storage elements, bias means for applying a bias potential to each of said devices, said charge storage elements being constructed and arranged to present a relatively low impedance to said switching pulses so that said pulses are applied therethrough to said unilaterally conductive devices, each of said channels comprising means for continuously producing an output corresponding to the charge stored by the respective storage element without discharging that element.

5. In a system for distributing information-bearing signals from a single source to a plurality of separate channels, a different switching rectifier connected between said source and each of said channels for selectively permitting the transmission of signals thereto, a common bias source for biasing all said switching rectifiers to a predetermined inverse voltage so as to prohibit passage of signals of magnitude less than said voltage, a plurality of signal storage elements, each having a first terminal and a second terminal, with the first terminal of each storage element being connected to a separate one of said channels and the rectifier connected thereto, means for generating a switching signal for each of said channels, each switching signal comprising a voltage pulse of amplitude greater than said predetermined bias voltage, and means for time sequentially applying said switching signals to the second terminals of said storage elements to sequentially unbias said rectifiers.

6. In a system for periodically discharging and recharging a capacitor in accordance with instantaneous values of a time varying intelligence signal, a source of time varying intelligence signal, first biased rectifier means connected between said source and said capacitor for normally prohibiting charging of said capacitor from said source, second biased rectifier means normally prohibiting discharge of said capacitance, means for providing a series of time spaced switching pulses, circuit means for applying said switching pulses to one electrode of said capacitor and for coupling both said rectifier means to the other electrode of said capacitor so that said switching pulses are translated by way of said capacitor to selectively unbias said rectifiers and means connected to said other electrode of said capacitor for continuously utilizing the signal stored thereby without discharging the same.

7. In a signal distribution system, a source of intelligence signal, charge storage means for maintaining a charge substantially corresponding to an instantaneous amplitude of said intelligence signal, a unilaterally conductive device connected between said signal source and said charge storage means so as to normally block the passage of said signal thereto and responsive to voltage pulses of predetermined amplitude to pass charging current from said source to said charge storage means, pulse circuit means connected to said charge storage means to apply time spaced voltage pulses of predetermined amplitude to said unilaterally conductive device by way of said charge storage means and means connected to the common terminal of said charge storage means and said unilaterally conductive device for continuously utilizing, during the time intervals between said pulses, the charge maintained by said storage means.

8. In a signal distribution system, a source of intelligence signal, charge storage means for maintaining charges corresponding to instantaneous amplitudes of said intelligence signal, a rectifier device connected in series with said signal source between a point of reference potential and one terminal of said charge storage means so as to normally block the passage of said intelligence signal to said charge storage means, and means for providing time spaced voltage pulses of predetermined amplitude, said last-mentioned means being connected between said point of reference potential and the other terminal of said charge storage means and means connected to said one terminal for continuously utilizing the signal stored by said storage means during the time intervals between said time spaced pulses.

References Cited in the file of this patent

UNITED STATES PATENTS 2,568,375 Toulon ---------------- Sept. 18, 1951

2,720,642 Blakely ---------------- Oct. 11, 1955
2,828,447 Mauchly ---------------- Mar. 25, 1958
2,847,159 Curtis ---------------- Aug. 12, 1958

OTHER REFERENCES

Tele-Tech and Electronic Industries, November 1953 (Diode-Capacitor Memories for High-Speed Computers), pp. 85, 138, 139, 140.